United States Patent [19]

Kudelski

[11] Patent Number: 4,513,229

[45] Date of Patent: Apr. 23, 1985

[54] REEL SERVO FOR TAPE TRANSPORT

[75] Inventor: Stefan Kudelski, Le Mont-sur-Lausanne, Switzerland

[73] Assignee: Ampex Corporation, Redwood City, Calif.

[21] Appl. No.: 533,316

[22] Filed: Sep. 15, 1983

[30] Foreign Application Priority Data

Sep. 17, 1982 [GB] United Kingdom ............... 8226570

[51] Int. Cl.³ ............................................ B65H 59/38
[52] U.S. Cl. ......................................... 318/7; 318/6; 360/73; 360/74.3; 242/75.44; 242/75.51
[58] Field of Search ............... 318/6, 7, 98, 3, 48, 318/50, 432, 433; 360/73, 74.3, 96.2, 96.4; 242/75, 75.44, 75.51

[56] References Cited

U.S. PATENT DOCUMENTS

| | | | |
|---|---|---|---|
| 3,283,228 | 11/1966 | Asseo | 318/7 |
| 3,584,805 | 6/1971 | Lee | 318/7 X |
| 3,604,992 | 9/1971 | Audeh | 318/7 X |
| 3,606,201 | 9/1971 | Petusky | 318/7 X |
| 3,673,473 | 6/1972 | Werner | 318/7 |
| 3,734,426 | 5/1973 | Howes et al. | 318/7 X |
| 4,015,177 | 3/1977 | Martins | 318/7 |
| 4,160,195 | 7/1979 | Sakamoto | 318/7 |
| 4,341,363 | 7/1982 | Inatome | 318/7 X |
| 4,361,787 | 11/1982 | Negishi et al. | 318/6 |
| 4,429,261 | 1/1984 | Ohno | 318/7 X |

*Primary Examiner*—J. V. Truhe
*Assistant Examiner*—Bentsu Ro
*Attorney, Agent, or Firm*—George B. Almeida; Joel D. Talcott

[57] ABSTRACT

A supply reel servo for a tape transport in which a motor-driven capstan of low inertia draws tape past a cylindrical scanning drum includes a tension servo arm which provides a signal denoting tape tension in a loop adjacent the supply reel. This signal is compared with a reference to develop an error signal to control the supply reel motor. The reference is modified in response to a signal which represents the energization of the capstan motor and accordingly the torque output thereof so as to provide automatic compensation for variation in tape tension at the scanning drum.

15 Claims, 5 Drawing Figures

²

REEL SERVO FOR TAPE TRANSPORT

BACKGROUND TO THE INVENTION

This invention relates to tape transports and in particular to the control of a supply reel in a tape transport for regulating the tension in a magnetic tape for which the transport provides movement in a tape path extending around a cylindrical guide drum by means of which tape is guided in a helical path for scanning by a recording or playback head.

The need to regulate the tension in a magnetic tape in a tape transport is well-known, particularly when the transport forms part of a machine for recording signals on magnetic tape or playing back signals from such a tape. The stretchability of magnetic tape is notorious and is particularly susceptible to changes in temperature and humidity. The control of the tension in the tape is particularly important, because its variation affects the physical wavelengths of signals recorded on the tape and thereby causes undesirable variation in the frequencies played back from the tape and tends to cause deterioration in the quality of a played back signal.

It is well-known to provide means for sensing the tape tension in a tape path extending between a guide drum and, for example, a supply reel. Typically the means for sensing the tape tension comprises means for forming a loop of tape and for measuring the tape tension in that loop. A signal representing the tape tension may be used to control, in known manner, a motor driving the supply reel so as to tend to maintain the tape tension substantially constant. For this purpose it is known to provide a pivoted arm which carries a guide roller around which the tape path extends to form a loop so that variation in the tape tension causes pivoting of the arm. The pivoting can be sensed to provide a signal representing the tape tension and constituting, after comparison with a reference signal, an error signal for driving a servo amplifier for the motor which drives the reel. It is also known to correct for variations in tape tension by servomechanically controlling a take-up reel in accordance with detected tension errors and variations in the load experienced by a capstan disposed in the tape path between the take-up reel and the scanner. Although control of the loop tension in a buffer loop is an important feature of most tape transports, in order to ensure that a capstan driving the tape longitudinally is not loaded by the inertia of the tape reel and to ensure that the tape reel does not outrun the capstan, ordinary arrangements do not provide compensation for variation in tape tension at the scanner drum itself. One of the difficulties in doing so is the impracticability of monitoring the tape tension at or across the guide drum directly.

It is one object of the present invention to provide an improved tape transport.

It is another object of the present invention to provide compensation for variation in tension of a tape extending around a cylindrical guide drum in a tape transport for a video tape recorder.

SUMMARY OF THE INVENTION

The basis of the present invention resides in a tape transport in which a capstan drives tape around a cylindrical guide drum, the tape having a substantial angle of wrap around the guide drum and usually in a helical path thereabout, and servomechanical control of the tape tension in the tape at the side of the drum opposite to that on which the capstan is located is governed by the load on the capstan. In normal practice, the capstan is located in the tape path between the scanner drum and a take-up reel and accordingly a supply reel is preferably, according to the present invention, governed by feedback from the capstan. Thus in preferred embodiments of the invention a supply reel is driven by a servo to maintain the tension in a loop of tape between the guide drum and the supply reel substantially constant, and the servo receives feedback representing the torque required of a capstan downstream from the drum. This torque varies according to the friction at the scanner drum and thereby varies according to the tension of the tape around the drum, provided that the capstan is maintained at substantially constant speed, the capstan and its motor being preferably of low inertia. The present invention provides, in a preferred form, a control system in which a supply reel is controlled servomechanically, in accordance with the tension of a loop of tape formed between the drum and the reel, a capstan disposed downstream of a scanner drum is maintained at a constant speed and a reference for the servo control of the supply reel is varied in accordance with the capstan torque. Thus, for example, as the tape tension around the guide drum increases, and the consequent increase of friction at the drum requires, for the same speed of the capstan, an increase in the torque produced by the capstan, the energisation of the reel motor may be increased in accordance with the change in capstan torque so as to relieve the increase in tension.

It is usual to provide servomechanical control of the speed of the capstan and for this purpose the capstan is usually provided with a tachometer which is used to provide a signal representing the speed of the capstan. That signal may be compared (at least during recording) with a reference to provide an error signal for energising a motor for the capstan. The error signal is a measure of the torque required of the capstan and may be used to modify the reference employed for controlling the speed of the motor driving the supply reel. Control of the capstan during playback may be effected from the control track of the tape but the error signal which is formed by the capstan servo will be available in analogous manner as an indication of the capstan torque.

Other objects and advantages of the invention will be apparent from a consideration of the following description of a preferred embodiment of the invention with reference to the accompanying drawings.

DETAILED DESCRIPTION OF THE PREFERRED EMBODIMENT

Figure 1:
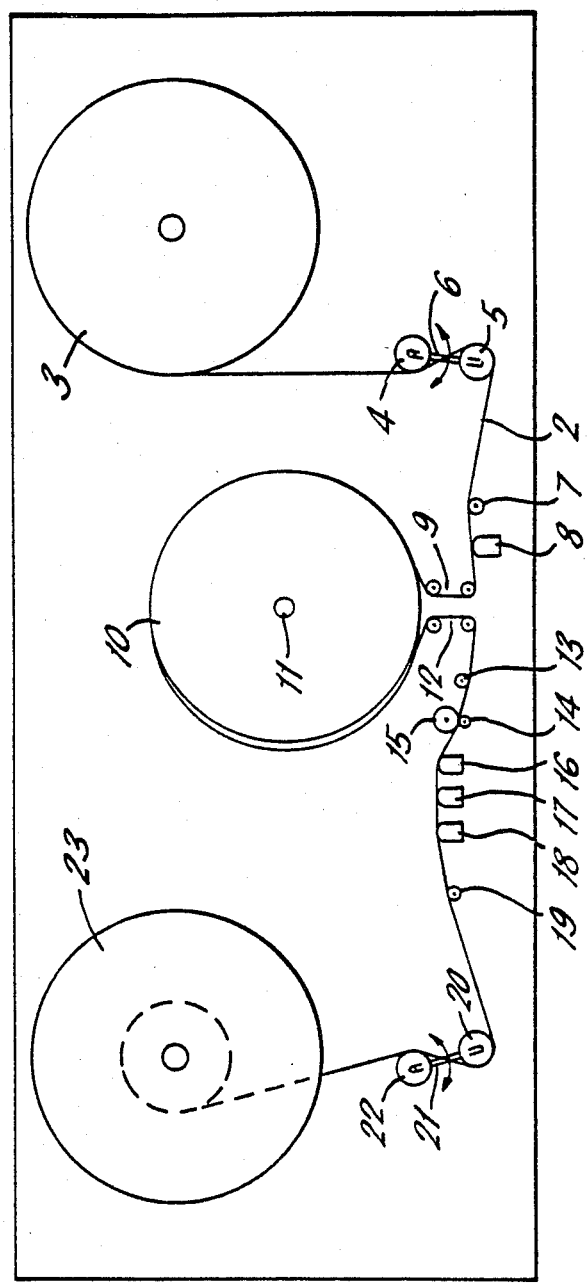
FIG. 1 is a simplified schematic illustration of a video tape recorder.
Figure 3:
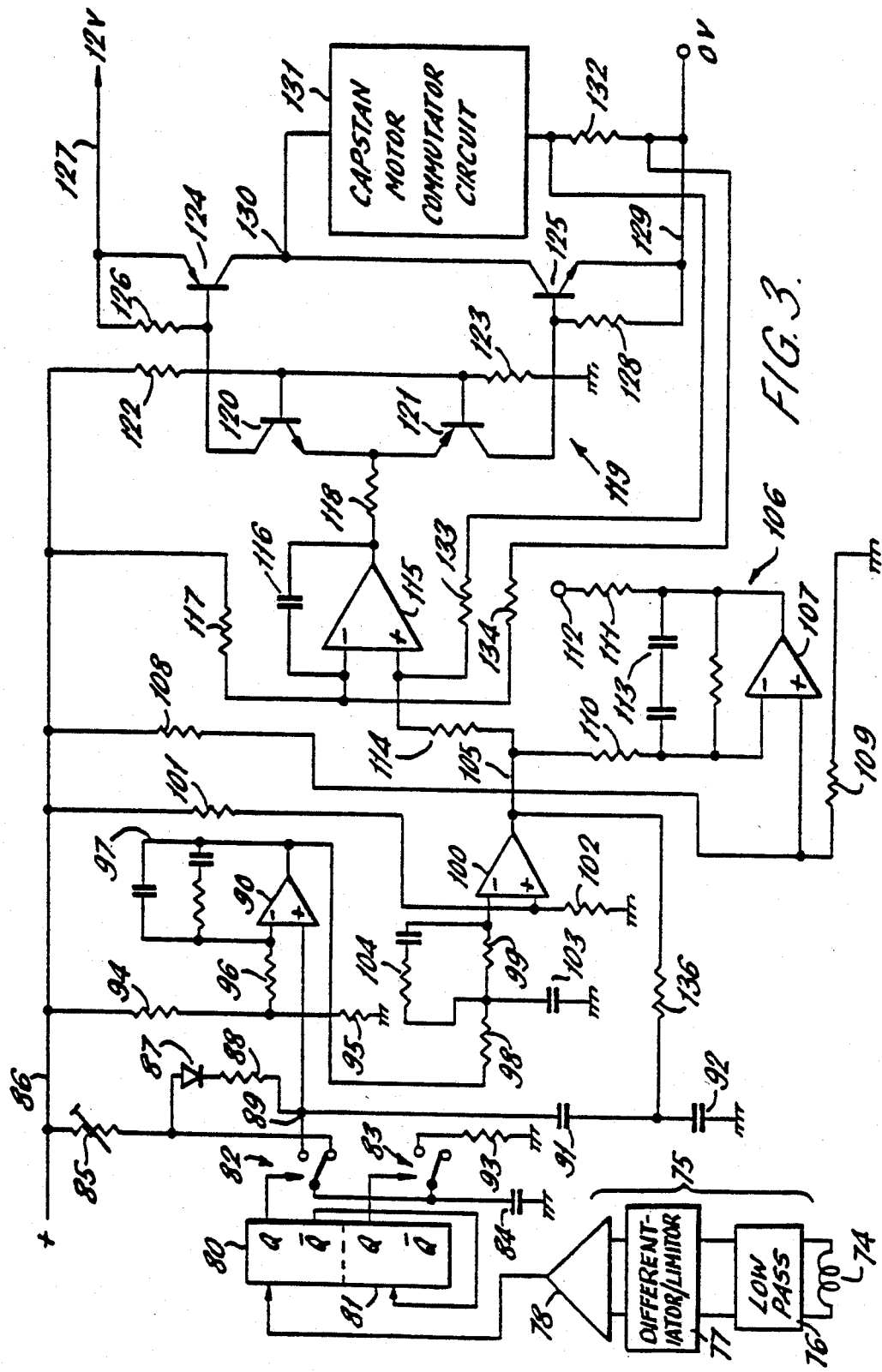
FIG. 3 is a circuit diagram of a capstan servo.

FIG. 1 illustrates in simplified form the principal parts of a video tape recorder. As is shown in FIG. 1, the recorder 1 is intended for recording signals on or playing back signals from a magnetic tape 2 which is supplied by a supply reel 3 driven by its own motor. A preferred drive circuit for the motor forms part of the circuit shown in FIG. 4. From the supply reel the path of the tape 2 extends around a fixed guide 4 and thence to a guide 5 which is carried at one end of an arm 6 pivoted coaxially with the guide 4. The purpose of the pivoted arm is to provide sensing of the tension of tape in the loop extending around the guide 4. If the tension in the tape in this loop increases, the arm 6 will rotate. The rotation of the arm can be sensed in any convenient manner to provide a signal representing the tape tension in the loop. However, a specific preferred form of circuit is shown in FIG. 3 and is intended for use with a sensing arm 6 constructed and arranged as described in our copending International Application of even date entitled "Tape Loop Sensing Arm and Tape Guide for Magnetic Tape Recording and Playback Machines".

From the guide 5 the path of the tape extends past a guide 7 and a video erase head 8 to a pair of guides 9 controlling the entrance of the tape to a helical path extending around a scanner drum 10 of which the axis 11 is slightly tilted relative to the general plane of the path of the tape. Within the drum is a motor driving around the periphery of the drum a scanning head for the scanning of the tape in oblique tracks. Although the proper control of the entrance and exit of the tape to its helical path and its following of the correct helical path are necessary for achieving a constant tape tension at the scanner the particular construction of the scanner and its associated guides is not part of the present invention. One suitable construction is disclosed in our International Application of even date entitled "Video Tape Recorders and Guide Assemblies Therefor".

At the end of the helical path of the tape around the drum 10 the tape passes around a pair of guides 12 and extends past a guide 13 to a capstan 14 which is provided with a pinch roller 15 for the maintenance of the tape in close proximity to the capstan. The tape path extends from the capstan past erase, audio and control track heads 16 to 18 and then around a further guide 19, a guide 20 mounted at one end of the pivoted arm 21 rotatable about a pivot, a further guide 22 which is coaxial with the pivot for the arm 21 and finally to a take-up reel 23. The guide 20 acts in a manner similar to the guide 5, pivoting movement of the arm 21 providing a measure of the tension in the loop of tape around the guide 20 and providing a tension-representative signal for controlling a motor (not shown) which drives the take-up reel 23.

Figure 2:
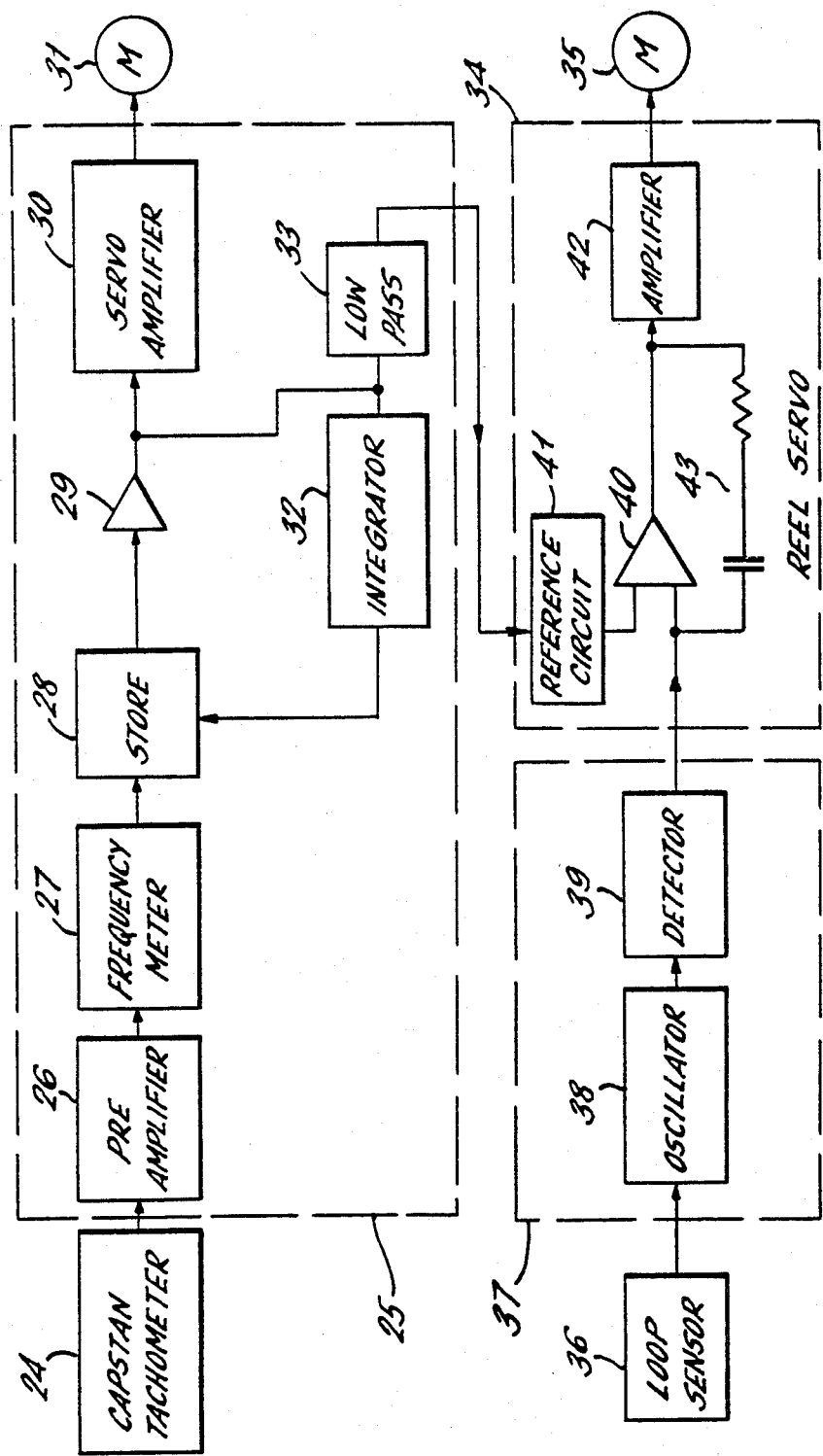
FIG. 2 is a schematic diagram of a control system in accordance with the invention.

FIG. 2 illustrates in schematic form a control system which is intended for use with the machine briefly illustrated in FIG. 1 and similar machines in which a capstan draws tape in a helical path around a cylindrical guide drum to which tape is supplied from a supply reel, there being a loop formed in the tape path between the cylindrical guide drum and the supply reel. In such machines, the capstan has, as previously mentioned, a tachometer which provides a signal of which the frequency represents the speed of the capstan. One suitable tachometer is described and illustrated in our International Application of even date entitled "Magnetic Tachometer Assembly." The particular construction of the tachometer is not relevant to the present invention.

In the system shown in FIG. 2, a capstan tachometer 24 provides a signal of which the frequency varies in accordance with the speed of rotation of the capstan. This signal is fed to a servo circuit 25 of which the principal parts are shown in FIG. 2 but which will be described in more detail with reference to FIG. 3.

In the servo circuit 25, the signal from the tachometer 24 is amplified by a preamplifier 26 so as to produce an output in the form of spike pulses at a frequency representative of the speed of the capstan. These pulses are fed to a frequency meter 27 providing an output in the form of a voltage likewise representing the speed of the capstan. In the specific embodiment to be described later, the frequency meter comprises a generator of a ramp signal which is sampled and restarted on the occurrence of each spike pulse derived from the tachometer output. The sampled output of the frequency meter is retained in a temporary store 28 (which may be constituted by a capacitor) and used as the input for an amplifier 29 which drives a servo-amplifier 30 coupled to provide energisation for a motor 31 driving the capstan 14. In a preferred embodiment the capstan motor 31 may be a brushless DC motor incorporated within the capstan, as set forth in our International Application of even date entitled "Tape-Driving Capstan". Although the particular construction of the capstan motor is not crucial, it is desirable that the capstan and its motor have low inertia.

The servo circuit 25 includes an integrator 32 coupled to augment the speed signal stored in capacitor 28 by the integral of the output of the amplifier 29. As is explained in our International Application of even date entitled "Control System for Electric Motor", this provides interpolation for the speed signal and enables the capstan servo to have a high open loop gain without instability; however, this feature is not crucial to the present invention.

The output of the amplifier 29 represents, before amplification, the signal which actually drives the motor 31 and is accordingly representative of the energisation of the motor 31 and the torque of the capstan. The signal at the output of the amplifier 29 is used, after it is passed through a low-pass filter 33, as an input to a reel servo circuit 34 driving a motor 35 coupled to drive the supply reel 3 of the tape transport. The manner in which the output from the amplifier 29 is used will be described in more detail later.

The construction and manner of operation of the motor 35 is not of consequence to the present invention, although the motor is preferably of the kind described in our International Application of even date, entitled "Reel Hub Assembly for Tape Transport".

The main control for the motor 35 is derived from a loop sensor 36. The construction and manner of operation of the loop sensor is not important to the present invention. However, it is preferred to employ a sensor of the kind described in our International Application of even date entitled "Tape Tension Sensor and Servo embodying same". In any event, it is sufficient for the sensor, in conjunction with a circuit illustrated generally within the dashed lines 37, to produce a signal which varies between appropriately chosen datums in accordance with the tension in the tape path formed adjacent the supply reel.

As is set forth in the aforementioned International Application of even date entitled "Tape Tension Sensor and Servo embodying same", the loop sensor includes a member which is mounted to rotate with the pivoted sensing arm (6) previously mentioned. The sensor includes a plate carrying lossy strips and the plate moves in a gap of a core carrying a coil which forms part of an oscillator 38 forming part of the circuit 37. The movement of the pivoted arm serves to alter the quality factor of the aforementioned coil and thereby to alter the amplitude of an oscillation produced by the oscillator 38. This amplitude is sensed by a detector 39 which thereby provides a direct voltage varying between appropriately chosen limits in accordance with the tension in the loop which is engaged by the loop sensor. A specific circuit arrangement for the circuit 37 is set forth in FIG. 4.

The output of the circuit 37 is fed to one input of an amplifier 40 forming part of the circuit 34. The amplifier 40 compares the "loop tension signal" with a reference shown as being supplied from a reference circuit 41 so as to provide at the output of the amplifier 40 a signal which is an amplified form of the difference between the signal denoting loop tension and a reference value. The output of the amplifier 40 is used to drive a servo-amplifier 42 coupled to drive the motor 35 associated with the supply reel 3.

If the effect on the circuit 34 of the output of the amplifier 29 is ignored, then, as will be apparent, the motor 35 drives the supply reel 3 so as to maintain a substantially constant loop tension. This is generally in accordance with known practice. For the sake of simplicity, various switching networks which may be provided at the input of the amplifier 40 have been omitted. These switching networks are provided because the control of the reel motor 35 in the manner described is not normally required for all the possible modes of operation of the transport, particularly for fast rewind, and accordingly the switching network is arranged to provide coupling of the various signals aforementioned to the amplifier only for those modes of operation for which control in the manner set forth herein is required. However, such switching networks are a commonplace feature of tape transports and will not be described.

It is found in practice that the output of the amplifier 29 fluctuates considerably, normally under-going a step change in consequence of each new tachometer pulse and in order that the output of the amplifier 29 should not cause unwanted transient disturbance of the driving of the motor 35, the low-pass filter 33 is preferably disposed between the amplifier 29 and the circuit 34.

Figure 5:
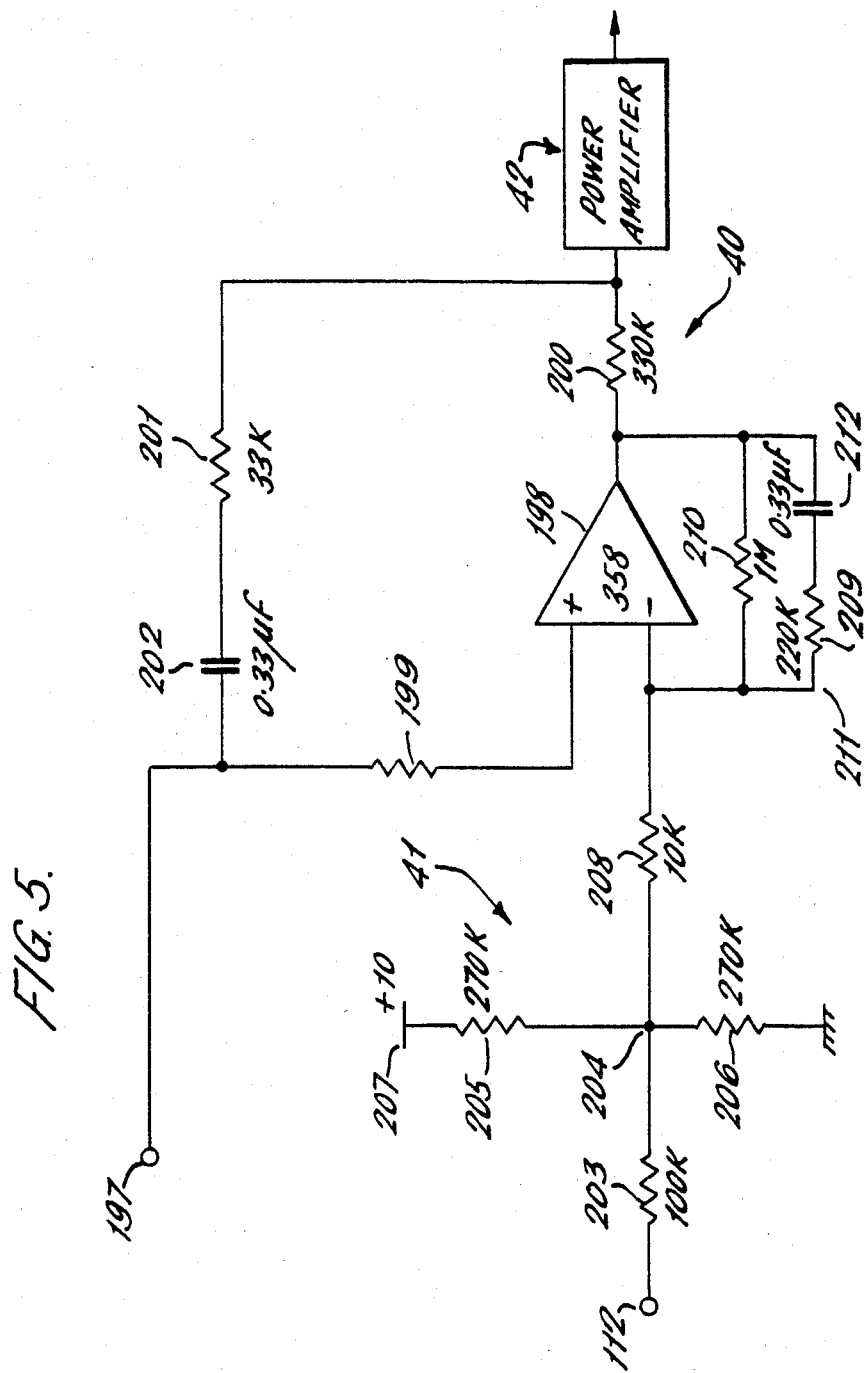
FIG. 5 is a schematic diagram of a drive circuit forming part of the system shown in FIG. 2.

As will be apparent in more detail from a consideration of FIG. 5, the coupling of the output of the amplifier 29, representing the torque required of the capstan, to the reel servo circuit is to vary, at least for a range of variation of the capstan torque, for modification of the reference provided by the circuit 41 to the amplifier 40 which governs the energisation of the motor 35.

As is mentioned above, although it is preferable to provide the low-pass filter 33, if the energisation of the capstan were sensed at some other point, for example by the use of a sensing resistor in the final drive circuit for the motor 31, such a low-pass filter 33 would not be necessary. The arrangement described is convenient because the low-pass filter can readily be arranged to produce a signal varying between convenient datums, as described hereinafter.

It is also found in practice that the signal representing the tape tension fluctuates considerably and in order to avoid excessive transient disturbance of the motor 35 it is convenient to provide the amplifier 40 with a transfer characteristic which is partly proportional and partially integrating. This is conveniently achieved by the provision of a feedback circuit 43 including a series resistor and series capacitor, as specifically illustrated in FIG. 5.

FIG. 3 illustrates in greater detail the capstan servo circuit denoted 25 in FIG. 2.

In practice the capstan servo is controlled during recording by comparing a speed signal from a tachometer directly driven by the capstan with a predetermined reference and during playback the capstan servo is controlled by signals taken from the control track on the tape. The particular source of the control of the capstan is not relevant to the present invention and accordingly only the capstan control during recording will be described in detail.

One input to the capstan servo circuit comprises a tachometer coil 74 which feeds the input of stages 75 which serve to shape and amplify the signal from the tachometer. In the present embodiment of the invention it is presumed that the tachometer signal is sinusoidal, as it would be provided by the tachometer described in the aforementioned International Application entitled "Magnetic Tachometer Assembly".

The stages 75 comprise a low-pass filter 76 which serves to cut off frequencies substantially above the ordinary range of variation of the fundamental frequency produced by the tachometer and differentiating-/limiting stages 77 which serve to convert the sinusoidal signal into spike pulses which are amplified in an amplifier stage 78. This stage feeds the input of one stage 80 of a dual monostable circuit of which the $\overline{Q}$ output triggers the second stage 81 of the dual monostable. The monostables control two switches 82 and 83 which would normally be constituted by transistor switches, shown as mechanical switches for the sake of simplicity. These two switches are connected to one plate of a capacitor 84 of which the other plate is grounded. The switch 82 normally connects the capacitor 84 through a variable resistor 85 to a positive supply rail 86. The lower end of the resistor 85 is connected by way of a diode 87 and a resistor 88 of very high resistance to a junction point 89 connected to the non-inverting input of an FET amplifier 90. The junction point 89 is connected to one plate of a capacitor 91 of which the other plate is connected to one plate of a capacitor 92 of which the other plate is grounded. The capacitor 92 is of substantially greater capacity than the capacitor 91, for example 47 microfarads as compared with 3.3 microfarads so that charge can be rapidly transferred from capacitor 84 to capacitor 91 without substantial effect on the charge held by capacitor 92.

The junction point 89 is also connected to the second output of the switch 82. The switch 83 normally connects the upper plate of the capacitor 84 to a first output which is isolated. The second output of the switch 83 is connected by way of a low value resistor 93 to ground.

Before the remainder of the circuit is described the operation of the switches 82 and 83 and the components associated therewith will be described.

The capacitor 84 constitutes, in conjunction with the resistor 85, a ramp generator which is rendered operative when the switch 82 connects the capacitor 84 to the first output terminal of the switch 82. When the first monostable 80 is triggered by derived tachometer pulse from the output of the amplifier 78, the Q output of the monostable 80 momentarily operates switch 82 so as to connect the capacitor 84 to the second output terminal of the switch 82. Immediately thereafter the $\overline{Q}$ output of monostable 80 triggers the monostable 81, of which the Q output operates switch 83 to connect the capacitor 84 to resistor 93, the switch 82 having meanwhile reverted to its former state in which capacitor 84 is connected to resistor 85. This switching action serves firstly to transfer charge from the capacitor 84 to the capacitor 91, the capacitor 91 thereby receiving a voltage representative of the ramp voltage which appeared across the capacitor 84, then to effect complete discharge of the capacitor 84 by way of the resistor 93, and finally to restart the generation of a ramp signal by means of the charging of capacitor 84 from the positive supply rail 86 through the resistor 85.

A voltage divider constituted by resistors 94 and 95 provides a reference voltage at the inverting input of the comparator amplifier 90 by way of a comparatively large value resistor 96. The amplifier 90 has a mainly low-pass feedback circuit 97 which provides some derivative control of stability in the forward direction of the amplifying circuit. Thus the sampled signal representing the speed of the capstan is compared with a reference and the difference is amplified to provide drive for the capstan motor by way of the further stages of amplification to be described hereinafter.

The comparator amplifier 90 feeds by way of a resistor 98 and a resistor 99 the inverting input of a further FET amplifier 100 of which the non-inverting input is referenced by a voltage divider comprising resistors 101 and 102 connected between the positive rail 86 and ground. Some phase adjustment, of no particular consequence to the present invention, is provided by a resistor-capacitor branch 104 shunting the resistor 99 and a shunt capacitor 103 between ground and the junction between resistors 98 and 99.

Feedback is taken from the output 105 of the amplifier 100 back to the store constituted by the capacitor 91 by way of a loop constituted by a passive integrator comprising a resistor 136 and the capacitor 92. The purpose of this integrator is explained in the aforementioned International Application entitled "Contrgl System for Electric Motor" and is, briefly, to provide anticipatory interpolation of the speed signal in the intervals between the sampling times at which it is measured. This is advantageous when the capstan and its motor are of low inertia and are driven at a low speed.

In order to monitor the energisation of the capstan so as to obtain an indication of the torque applied by the capstan and an indication of tension in the tape extending around the scanning head, the amplifier stage 100, which forms part of the amplifier 29 indicated in FIG. 2, is monitored by a circuit 106 coupled to the output line 105 of the amplifier 100. This circuit 106 comprises a comparator amplifier 107 of which the non-inverting input is referenced by a voltage divider comprising resistors 108 and 109. The inverting input of amplifier 107 is connected to the line 105 by way of a resistor 110 and the amplifier 107 has a parallel resistive/capacitative feedback circuit 113 and feeds by way of a resistor 111 an output terminal 112. The circuit 106 constitutes the low-pass filter 33 of previous mention and in practice is arranged to provide, at the output terminal 112, a voltage which varies between 8 volts and 2 volts as the torque required of the capstan varies from a maximum to a minimum. The output terminal 112 is connected to provide one of the inputs to the amplifier 40 of the reel servo circuit 34, which is shown in detail in FIG. 5.

The line 105 is connected by way of a resistor 114 to the non-inverting input of an amplifier 115 which has a capacitative feedback impedance 116 and of which the inverting input is connected by way of a resistor 117 to the positive rail 86. This amplifier 115 is an input stage for a power amplifier 119 of which a first stage is constituted by two complementary transistors 120 and 121 of which the emitters are connected in common to the output of amplifier 115 by way of the resistor 118. The bases of the transistors 120 and 121 are connected together to the junction of a voltage divider constituted by resistors 122 and 123 connected between the positive rail and ground. The collector of the transistor 120 is connected to the base of a power transistor 124 of which the emitter is connected to the base by way of a resistor 126 and is also connected to a positive rail 127. The collector of the transistor 121 is connected to the base of a power transistor 125 of which the emitter is connected to the base of the same transistor by way of a resistor 128 and is also connected to a rail 129 at zero volts. Between a junction 130, connected to the collectors of transistors 124 and 125, and the zero volts rail 129 is connected a capstan motor commutator circuit 131. This circuit is of no consequence to the present invention but is preferably an electronically switched circuit for energising the stator windings of the motor 31, which is preferably a brushless commutator motor. However, other forms of motor can readily be energised by the power amplifier in known manner.

Inserted between the commutator circuit 131 and the zero volts rail 129 is a current sensing resistor 132 the ends of which are connected respectively through resistors 133 and 134 to the non-inverting and inverting inputs respectively of the amplifier 115. This arrangement provides current feedback for the motor and provides some reduction of switching transients produced by the commutator circuit 131.

Figure 4:
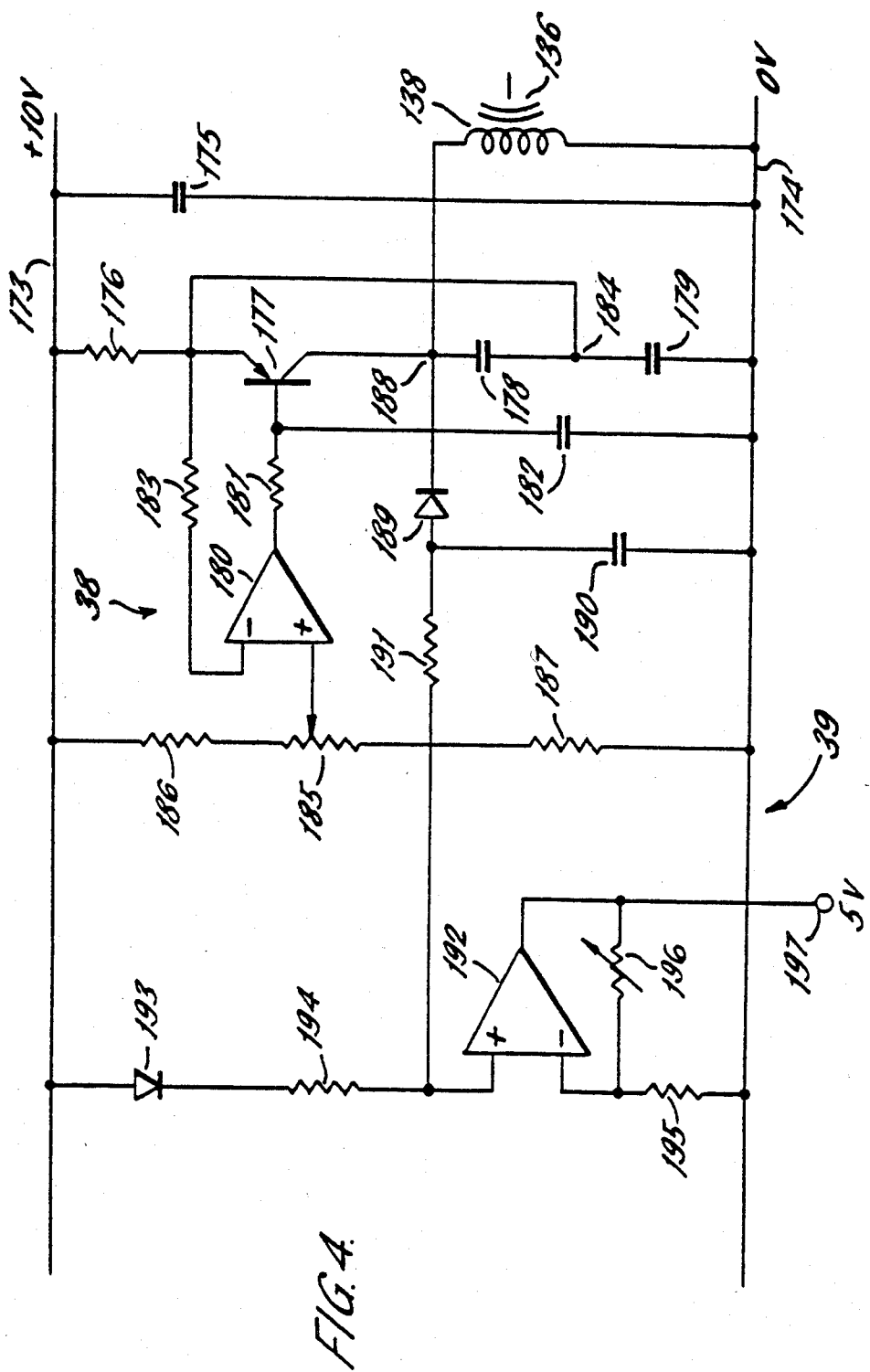
FIG. 4 is a diagram of a circuit providing a signal representing tape tension.

FIG. 4 illustrates the circuit associated with the tape loop sensor. The circuit shown in FIG. 4 receives an electrical supply from a positive rail 173 and a zero volts rail 174. The voltage between the rails is stabilised by a capacitor 175. A resistor 176 connects the positive rail to the emitter of a transistor 177 of which the collector is connected to the negative rail by way of two capacitors 178 and 179 in series. The output of an amplifier 180 is connected by way of a resistor 181 to the base of the transistor 177. The base of this transistor is connected to the zero volts rail 174 by way of a capacitor 182 and the emitter of the transistor 177 is connected to the inverting input of amplifier 180 by way of a resistor 183. The emitter of transistor 177 is connected to the junction 184 of the capacitors 178 and 179. The non-inverting input of the amplifier 180 is connected to the tap of a variable resistor 185 which is connected to the positive rail 173 by way of resistor 186 and to the negative rail 174 by way of resistor 187.

The amplifier 180 and the transistor 177 constitute the active components of an oscillator of which the operating frequency is determined by the capacitors 178 and 179 together with the coil 138. The amplitude of the oscillation varies according to the quality factor of the coil 138 which, as previously mentioned, is varied according to the position of the lossy strips 136 which are carried on a plate mounted for movement with the sensing arm 6 shown in FIG. 1.

In order to monitor the amplitude of the output of the oscillator, the detector 39 is connected between the rail 174 and the point 188 between the capacitor 178 and the collector of transistor 177. The detector comprises a diode 189 which couples the point 188 to one plate of a capacitor 190 of which the other plate is connected to the rail 174. The upper plate of the capacitor 190 is connected by way of a resistor 191 to the non-inverting input of an amplifier 192. This amplifier is, as is the amplifier 180, preferably of type 358. The non-inverting input of the amplifier 192 is connected to the positive rail 173 by way of a diode 193 and a resistor 194. The inverting input of the amplifier 192 is connected to the zero volts rail 174 by way of a resistor 195 and to an output line of the amplifier 192 by way of a variable resistor 196. The output line of the amplifier 192 extends to an output terminal 197, nominally at five volts.

The purpose of the detector 39 constituted by the amplifier 192 and the associated components is to provide an output varying from 2 volts (when the tape tension is at a maximum) to 8 volts (when the tape tension is at a minimum).

FIG. 5 illustrates in more detail the amplifier 40 of the reel servo circuit 34 and the components associated therewith.

One input to the amplifier circuit 40 is the terminal 197 already mentioned in reference to FIG. 4; at this input terminal appears a voltage which varies in accordance with the tension of the tape in the loop sensed by the sensing arm 6. The voltage varies between 2 volts for maximum tape tension and 8 volts for minimum tape tension. The terminal 197 is coupled to the non-inverting input of an amplifier 198 by way of an 82 kilohm resistor 199. The output of the amplifier 198 is connected by way of a 330 kilohm resistor 200 to an output line, which may feed the input of a power amplifier 42 (FIG. 2) of which the construction is not important for the present invention.

The circuit 43 in FIG. 2 is in FIG. 5 represented by the series RC circuit, constituted by the resistor 201 and the capacitor 202 connected between the resistor 200 and the input terminal 197. The resistor 201 may be a 33 kilohm resistor and the capacitor 202 a 0.33 microfarad capacitor.

The input to the non-inverting terminal of the amplifier 198 will be at approximately five volts when the sensing arm 6 is in its mean position but, as previously mentioned can vary in a range extending from a minimum, selected to be two volts when the tension in the tape is a maximum, to a maximum, selected to be eight volts, when the tension in the tape sensed by the arm 6 is a minimum. This input, representing the tape tension, is compared with a reference signal provided by the reference circuit 41 previously discussed with reference to FIG. 2. For simplicity the aforementioned switching networks which are disposed between the reference circuit 41 and the amplifier 198 have been omitted.

The reference circuit 41 receives at the terminal 112, corresponding to the terminal 112 in FIG. 3, the signal which represents capstan torque. This signal, which varies between two volts and eight volts is coupled by way of a resistor 203 to the junction 204 between two resistors 205 and 206 which are connected between ground and a positive rail 207 at ten volts. The junction point 204 is coupled to the inverting input of the amplifier 198 by way of an input resistor 208.

Between the output terminal of the amplifier 198 and the inverting input terminal is a feedback circuit 211 comprising a resistor 210 shunted by a series combination of a resistor 209 and a capacitor 212, so that the amplifying characteristic of the amplifier 198 is partly proportional and partly integrating.

The purpose of the reference circuit 41 is to provide for comparison with the signal representing tension in the tape engaged by the guide 5, a reference signal which varies in a range in accordance with the signal which represents the capstan torque, so that when the capstan torque indicates that the tape-to-scanner friction is low, the reference is such as to prescribe a relatively high tape tension on the supply side, and when the capstan torque indicates that the tape-to-scanner friction is high, the reference is such as to prescribe a relatively low tape tension on the supply side. The tape tension is, of course, regulated to the reference by the control of the speed of the supply reel which is driven in accordance with the error signal developed by the amplifier 198.

The range of variation of the reference should preferably be considerably less than the total possible range of tension which can be accommodated by the sensing arm. In practice, it is convenient to arrange the system so that during normal tape transport the supply tape tension should vary in an upper half of a range and so that during, for example, fast wind the supply tension varies in a lower half of the range. Since the signal which represents tape tension is at two volts when the tape tension is a maximum, the resistive values should be chosen for the reference circuit and the amplifier so that the reference effectively varies within the range from five volts to two volts, and preferably within a slightly narrower range than this. Suitable values for the components are indicated in FIG. 5.

I claim:

1. In a tape transport which includes a motor-driven capstan for drawing tape past a cylindrical guide drum and tape is supplied to said drum by a driven supply reel, and including means for forming a loop of tape along a tape path between the supply reel and the cylindrical guide drum, the combination comprising:
   means for energising the capstan motor;
   means coupled to the energising means for supplying a signal representing the energisation of the capstan motor;
   means for generating a signal representative of the tension in the tape from the supply reel;
   means for providing a reference signal;
   means for comparing the reference signal with the signal representative of the tape tension to provide an output signal for controlling the energisation of the supply reel motor; and
   means for modifying the reference signal in response to the signal representing the energisation of the capstan motor.

2. The combination set forth in claim 1 in which the means for energising the capstan motor comprises:
   a capstan servo responsive to signals representing the desired and actual speeds of the capstan to provide a servo-error signal;
   power amplifier means responsive to the servo-error signal for energising the capstan motor; and
   means responsive to the servo-error signal to provide the said signal representative of the energisation of the capstan motor.

3. The combination set forth in claim 2, further comprising:
   low-pass filter means for supplying the said signal representing the energisation of the capstan motor.

4. The combination set forth in claim 1 or claim 3, in which the said means for comparing includes an amplifier having one input coupled to receive the signal representative of tape tension and another input coupled to receive the reference signal.

5. The combination set forth in claim 1 in which the means for generating a signal representative of the tape tension comprises:

means for sensing the tape loop tension;
an oscillator circuit;
means coupled between the means for sensing and the oscillator circuit to provide variation in an amplitude of oscillation of the oscillator circuit in response to variations in tension; and
means for detecting said amplitude and providing a voltage varying in accordance therewith.

6. In a tape transport which includes a motor-driven capstan for drawing tape around a cylindrical guide drum, tape being supplied to said drum by a driven supply reel, and including means for sensing the tension in the tape along a tape path between the supply reel and the cylindrical guide drum, the combination comprising:
means for energising the capstan motor;
means, including the said means for energising, for regulating the speed of the capstan;
means coupled to the energising means for supplying a signal representing the torque output of the capstan motor;
means for providing a signal representative of the said tape tension;
means providing a reference signal;
means for comparing the reference signal with the signal representative of the tape tension to provide an output signal for controlling the energisation of the reel motor; and
means for modifying the reference signal in response to the signal representing the torque output of the capstan motor so as to effect adjustment of said tension in compensation for variation of tape tension around said drum.

7. The combination set forth in claim 6 in which the means for regulating the speed of the capstan motor comprises a servomechanism responsive to the speed of the capstan and a reference to develop an error signal for energising the capstan motor.

8. The combination set forth in claim 7 in which the said servomechanism comprises a tachogenerator for providing pulses at a frequency representative of the speed of the capstan; means for generating a repetitive ramp signal, means for sampling and restarting said ramp signal in response to each of said pulses, means for successively storing samples of said ramp signal, and means for comparing said samples with a reference to provide the error signal.

9. The combination as set forth in claim 8 further comprising means for integrating said error signal and augmenting said samples to provide prediction thereof.

10. The combination as set forth in claim 6 in which the means for comparing comprises a difference amplifier having two inputs and the means for providing a reference comprises a potential divider having a junction point coupled to receive said signal representative of the capstan torque and coupled to one input of the amplifier.

11. A tape transport in which a supply reel is arranged to be driven by a servomechanism which responds to the tension in a length of tape between the supply reel and a scanner drum and compares the tape tension with a reference, and in which a tape-driving capstan is provided between the scanning drum and a tape-up reel, the combination comprising:
means for sensing the torque supplied to the capstan; and
means for varying the reference for the said servomechanism in response to the means for sensing the torque, to provide automatic compensation for variation in the tension of the tape at the drum.

12. A tape transport in which the tension in a tape between a scanner drum and a supply reel is controlled by a servomechanism which includes means for sensing the said tension and means for comparing the tension with a reference, and in which a servo-controlled capstan is provided for drawing tape supplied by the reel around the scanner drum, in which system there are provided means for sensing the energisation of the capstan to vary accordingly the reference for the said servomechanism in response to the sensed energisation of the capstan, so as to adjust the said tension to provide automatic compensation for variation in the tension of the tape at the drum.

13. In a tape transport for transporting tape from a supply reel around a rotary scanning drum to a take-up reel, including a servocontrolled capstan disposed to engage the tape between the drum and one of said reels and a servomechanism for controlling the tension in the tape between the drum and the other of said reels, the improvement comprising:
means for sensing the energisation of the capstan; and
means, coupled to the means for sensing, for modifying the operation of the said servomechanism in response to the sensed energisation of the capstan to compensate automatically for variation of the tape tension at the scanner drum.

14. A reel servo circuit for automatically compensating for variations in tape tension at a tape scanning drum, which drum receives tape from a driven supply reel, and including means for generating a signal indicative of the tension in the tape from the supply reel, comprising:
capstan means for pulling the tape from the tape scanning drum;
capstan servo means for energising the capstan means while supplying a reference signal representative of the capstan means torque; and
means for driving the supply reel in accordance with the signal indicative of the tension in the tape and further in response to the reference signal representative of the capstan means torque.

15. The circuit of claim 14 wherein the means for driving include:
means for comparing the reference signal representative of the capstan means torque with the signal indicative of the tension in the tape to provide automatic compensation for the variations in tape tension at the tape scanning drum.

* * * * *

UNITED STATES PATENT AND TRADEMARK OFFICE
CERTIFICATE OF CORRECTION

PATENT NO. : 4,513,229
DATED      : April 23, 1985
INVENTOR(S) : Stefan Kudelski It is certified that error appears in the above-identified patent and that said Letters Patent is hereby corrected as shown below:

Title page, item [73], should read --Kudelski S.A., Lausanne,

Switzerland and Ampex Corporation, Redwood City, California--.

Column 7, line 36, "contrgl" should read--control--.

Signed and Sealed this

Twenty-second Day of June, 1993

Attest:

MICHAEL K. KIRK

Attesting Officer

Acting Commissioner of Patents and Trademarks